No. 844,980. PATENTED FEB. 19, 1907.
J. C. WELCOME, Sr.
SNAP HOOK.
APPLICATION FILED APR. 17, 1906.

WITNESSES:
Edward Thorpe.

INVENTOR
Jacob C. Welcome, Sr.
BY Munn & Co
ATTORNEYS

UNITED STATES PATENT OFFICE.

JACOB C. WELCOME, SR., OF BURNS, OREGON.

SNAP-HOOK.

No. 844,980.      Specification of Letters Patent.      Patented Feb. 19, 1907.

Application filed April 17, 1906. Serial No. 312,196.

*To all whom it may concern:*

Be it known that I, JACOB C. WELCOME, Sr., a citizen of the United States, and a resident of Burns, in the county of Harney and State of Oregon, have invented a new and Improved Snap-Hook, of which the following is a full, clear, and exact description.

The purpose of the invention is to provide a snap-hook particularly adapted for use in connection with harness, so constructed that all springs are dispensed with and so that even if the snap is closed it will automatically open when a ring or like object is passed to the bill of the hook and whereby the snap will be automatically closed by the entered object when within the bill, but that after the hook is engaged with an object it will not become disengaged until purposely released.

A further purpose of the invention is to so locate the trigger provided with a locking member that while it is readily accessible to the operator it will not be operated upon by objects against which the hook may have bearing.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1:
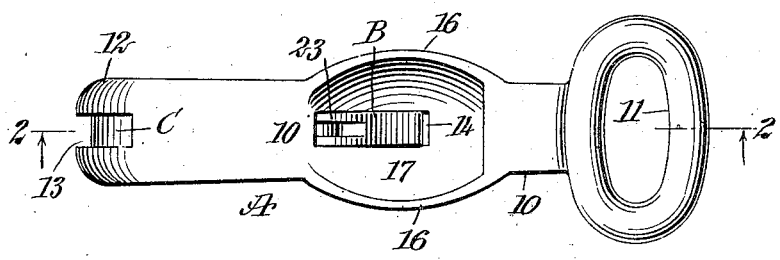
Figure 2:
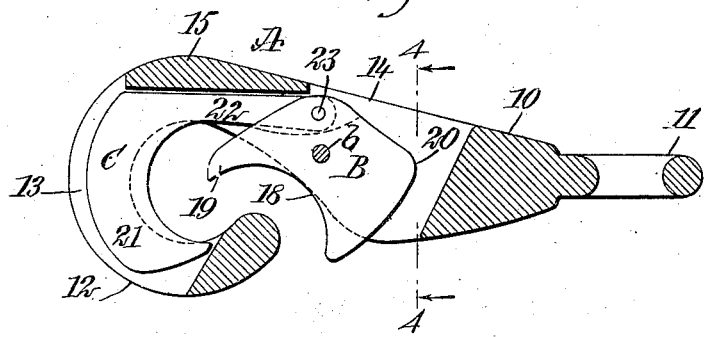
Figure 3:
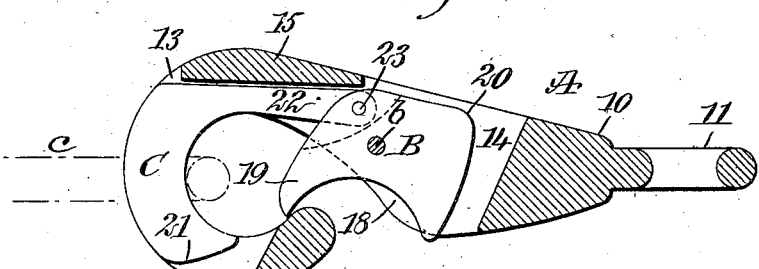
Figure 4:
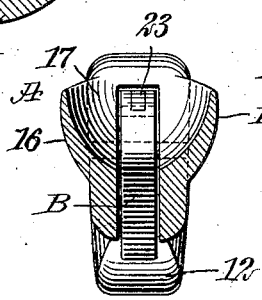

Figure 1 is a rear elevation of the device. Fig. 2 is a longitudinal section through the device with the parts in receiving position, the section being taken practically on the line 2 2 of Fig. 1. Fig. 3 is a view similar to that shown in Fig. 2, but illustrating the parts in locked position; and Fig. 4 is a transverse section taken practically on the line 4 4 of Fig. 2.

In the construction of the hook A a shank 10 is provided having a bill 12 at one end and an eye 11 at its opposing end, and said bill is provided with a longitudinal chamber 13, extending through from one longitudinal edge to the other, and the shank 10 is also provided with a longitudinal chamber 14, which chamber connects with the chamber 13 in the bill. The chamber 14 extends through the inner longitudinal edge of the shank 10, but extends through its back or outer longitudinal edge for a portion of its length only, as shown in Figs. 2 and 3, being separated at the back portion of the shank from the chamber 13 in the bill 12 by a solid longitudinal section 15.

At that portion of the chamber 14 which extends through the back of the shank 10 of the hook outwardly-curved ears 16 are provided at each side of said shank, having their inner faces concaved, so as to form a socket 17, (best shown in Figs. 1 and 4,) which socket is in communication with the inner end portion of the chamber 14 of the shank or that portion of the chamber which extends through its back. A trigger B is pivoted in the chamber 14 where said chamber extends through from the inner to the outer edge of the shank by means of a suitable pin *b*, as illustrated in Figs. 2 and 3. This trigger B at its inner longitudinal edge is provided with a concavity 18, and at its forward edge a spur 19 is formed, adapted in one position of the trigger, as is shown in Fig. 3, to engage with the end portion of the bill 12 to close the said bill and prevent the object located therein from slipping out therefrom. In the other position of the trigger, which is its open position, as shown in Fig. 2, the locking-spur 19 is carried sufficiently away from the extremity of the bill 12 to permit the entrance of a ring or like object to the hook-shaped bill, and the concaved surface 18 on the trigger at such time greatly facilitates such passage into said bill. When the spur 19 of the trigger is in its closed position, (shown in Fig. 3,) the heel 20 of the trigger or its outer rear corner portion extends out into the socket 17 and is readily reached by the finger or thumb of the operator, even though gloved; but the trigger is sufficiently removed from the back of the hook and is so protected by the socket in which it lies that if the back of the hook should come in engagement with an object it would not accidentally move the trigger and carry its locking-spur to open position, which action is accomplished by pushing on the heel-section 20 of the trigger.

A lock-lever C is provided for the trigger B. This lock-lever consists of a hook-section 21, which lies and has transverse movement in the chamber 13 of the bill 12, and a shank-section 22, which extends into the chamber 14 of the shank, being guided by the solid section 15, and the inner end of the shank 22 of the said lock-lever is pivotally attached at 23 to the outer upper corner portion of the trigger B, or that portion which is adjacent to the inner end of the solid section 15.

When the trigger is in the position shown in Fig. 2, wherein its locking-spur is carried away from the bill 12, when an object c is passed into the said bill and tension is applied to the object the body of the lock-lever, which at such time protrudes into the space surrounded by the bill, will be drawn upon and such portion of the lock-lever will be carried outward into the chamber 13 of the bill, and such movement of the lock-lever will carry the spur 19 to locking engagement with the bill 12, as shown in Fig. 3. At such time the article cannot accidentally leave the space inclosed by the bill 12 and the spur 19 until the trigger B is purposely operated to open the passage to the bill. If, however, the spur 19 is in locking engagement with the bill and it is desired to pass an object into the space surrounded by the bill 12, it is simply necessary to bring the article in engagement with the outer edge of the spur 19 and force the spur back until the object can enter the said space and engage with the lock-lever C, whereupon the said lock-lever will again close the spur against the bill of the hook.

Having thus described my invention, I claim as new and desire to secure by Letters Patent—

1. A snap-hook provided with a chamber in its shank extending for a portion of its length through its back, and a connecting-chamber located in the bill of the hook, a trigger pivotally mounted in the chamber of the shank at that portion which extends through from edge to edge of the shank, said trigger being provided with a spur adapted for locking engagement with the bill of the hook, and a lock-lever mounted to slide in the chamber of the bill, the lock-lever being pivotally connected with said trigger.

2. A snap-hook the shank of which is provided with a longitudinal chamber extending for a portion of its length from one longitudinal edge to the other, a chamber in the bill communicating with the chamber in the shank, the outer side portions of the said shank at its back, where the chamber of the shank extends through being enlarged and formed into a socket, a trigger pivotally mounted in the chamber of the shank, one portion whereof extends into said socket, the inner portion being provided with a spur adapted for locking engagement with the bill, and a lock-lever having sliding movement in the chamber of the bill to and from the said trigger, which lock-lever is pivotally connected with the trigger to automatically carry the spur to locking engagement with the bill of the hook when an article is introduced into the space surrounded by the said bill.

3. In a snap-hook, a shank provided with a longitudinal chamber extending for a part of its way through the front and the back edge thereof, and for its full length through the inner edge thereof, a bill at one end of said shank, having a longitudinal chamber therein in communication with the chamber in the shank, an eye at the opposite end of the said shank, a trigger mounted in the chamber of the shank at the portion extending through from edge to edge, the inner edge of the said trigger being concaved, the said trigger having a spur formed at the forward portion of its edge for engagement with the said bill, the lower rear portion of the trigger being adapted to pass out through the slotted back portion of the shank, a lock-lever mounted to slide in the chamber of the bill and pivotally connected with the said trigger, and a guard extending above and surrounding the portion of the trigger exposed at the back of the hook.

In testimony whereof I have signed my name to this specification in the presence of two subscribing witnesses.

JACOB C. WELCOME, Sr.

Witnesses:
G. A. REMBOLD,
CHAS. W. PARRISH.